United States Patent [19]
Gustavson et al.

[11] Patent Number: 6,005,370
[45] Date of Patent: Dec. 21, 1999

[54] AUTOMATIC RATE CONTROL FOR DEFIBRILLATOR CAPACITOR CHARGING

[75] Inventors: Douglas M. Gustavson, Guilford, Conn.; Scott O. Schweizer, Snohomish; David W. Tecklenburg, Mill Creek, both of Wash.

[73] Assignee: Physio-Control Manufacturing Corporation, Redmond, Wash.

[21] Appl. No.: 09/013,805

[22] Filed: Jan. 26, 1998

[51] Int. Cl.$^6$ .................................................. H02J 7/00
[52] U.S. Cl. ........................................ 320/137; 320/166
[58] Field of Search ............................ 320/137; 363/20, 363/21, 79, 95, 97

[56] References Cited

U.S. PATENT DOCUMENTS

| | | | |
|---|---|---|---|
| 4,233,659 | 11/1980 | Pirkle ........................................ | 363/134 |
| 4,394,719 | 7/1983 | Moberg ...................................... | 363/18 |
| 5,073,751 | 12/1991 | Kaitandjian et al. ..................... | 320/166 |
| 5,199,429 | 4/1993 | Kroll et al. ................................. | 607/5 |
| 5,222,480 | 6/1993 | Couche et al. ............................. | 607/5 |
| 5,285,779 | 2/1994 | Cameron et al. ......................... | 320/166 |
| 5,350,405 | 9/1994 | Silvian ....................................... | 607/8 |
| 5,372,605 | 12/1994 | Adams et al. .............................. | 607/5 |
| 5,376,874 | 12/1994 | Ramme ..................................... | 320/160 |
| 5,407,444 | 4/1995 | Kroll .......................................... | 607/5 |
| 5,447,522 | 9/1995 | Chang et al. .............................. | 607/7 |
| 5,458,621 | 10/1995 | White et al. . | |
| 5,488,553 | 1/1996 | Renger . | |
| 5,562,595 | 10/1996 | Neisz ......................................... | 600/16 |
| 5,592,108 | 1/1997 | Tsukahara ................................. | 326/69 |
| 5,717,578 | 2/1998 | Afzal .......................................... | 363/21 |

FOREIGN PATENT DOCUMENTS

| | | |
|---|---|---|
| 0653692A2 | 5/1995 | European Pat. Off. . |
| WO95/11058 | 4/1995 | WIPO . |

Primary Examiner—Peter S. Wong
Assistant Examiner—Lawrence Luk
Attorney, Agent, or Firm—Christensen O'Connor Johnson & Kindness PLLC

[57] ABSTRACT

A control circuit ideally suited for a capacitor charging circuit (100) that uses an apparent measure of current flow through a circuit line to regulate current drawn from a battery through the circuit line is disclosed. A summing circuit (136) produces a difference voltage (138) of the battery voltage (152) subtracted from a threshold reference voltage (151). The difference voltage (138) is subsequently amplified by an amplifier (140), rectified by a diode (142), and added to a voltage measure (130) from a current-sense resistor (117) by a summing circuit (128). The resulting voltage measure (126) is an apparent measure of current flow and is provided to a charge controller (122) which regulates current flow through a transformer (107) by controlling the operation of a switch (108). As the voltage on the battery (102) decreases below the reference voltage set by voltage source (150), the increasing difference voltage (138) adds bias to the actual measure of current flow (130), thus providing the charge controller (122) with an apparent measure of current flow through the transformer (107) that is higher than the actual level of current flow. The charge controller is thereby deceived and reduces the current drawn from the battery through the transformer.

12 Claims, 1 Drawing Sheet

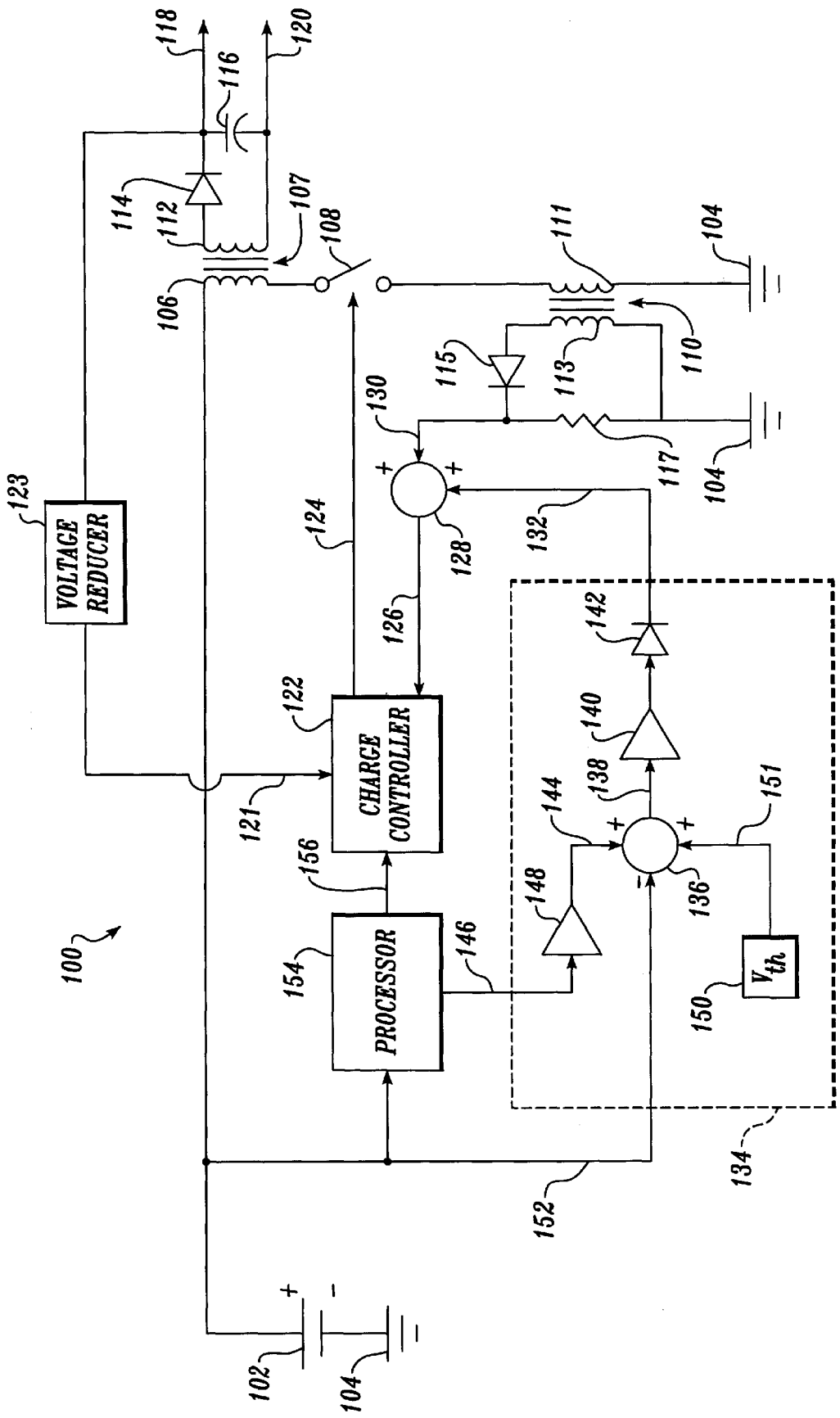

AUTOMATIC RATE CONTROL FOR DEFIBRILLATOR CAPACITOR CHARGING

FIELD OF THE INVENTION

The invention relates generally to capacitor charging circuitry, and more particularly to charge rate control circuitry for defibrillators.

BACKGROUND OF THE INVENTION

Disturbances in the normal beating pattern of a human heart can present a serious life-threatening situation for an individual. Particularly dangerous is ventricular fibrillation in which activity within the ventricles of the heart is so uncoordinated that virtually no pumping of blood takes place. Defibrillation therapy can interrupt ventricular fibrillation and allow a normal beating pattern to be restored. Such therapy generally involves rapid delivery of a relatively large amount of electrical energy to the heart at a high voltage.

A typical defibrillator includes a pair of electrical leads for collecting electrical signals generated by the heart and for delivering defibrillation therapy. In addition, a defibrillator generally includes one or more batteries, energy storage capacitors, and control circuitry for charging the capacitors and delivering defibrillation therapy through the leads.

At present, batteries are not generally suited for directly providing the high energy, high-voltage electric pulses required for defibrillation therapy. Consequently, it is customary for defibrillators to include one or more high-voltage energy storage capacitors that are charged from a battery via appropriate charging circuitry. Once charged, the capacitors are selectively discharged by a physician or medical technician to provide the defibrillation therapy to the patient. In normal operation, the high-voltage energy storage capacitors are not maintained in a state of charge, but rather are charged immediately preceding the delivery of defibrillation therapy.

Charging circuitry in a defibrillator generally includes a switch controlled by a charge controller. At the direction of the charge controller, the switch cyclically interrupts current flow from a battery through a primary winding of a step-up transformer in order to induce a transient current in a secondary winding of the transformer during a fly-back period. The induced fly-back current in the transformer secondary winding is applied to the terminals of a high voltage energy storage capacitor, thereby causing the capacitor to charge over a number of switching cycles. Typically, the charge controller monitors both the current flowing through the primary winding and the amount of charge on the capacitor in directing the operation of the switch.

One or more batteries coupled to the defibrillator supply the energy for charging the energy storage capacitor. As a battery is depleted of its energy, electrical resistance within the battery increases. For most battery technologies, a battery experiences a gradual rise in internal resistance relative to decreasing battery terminal voltage until a point at which the internal resistance rises quickly as the battery voltage drops. Different battery technologies have different internal resistance to voltage curves.

When a defibrillator begins to charge its energy storage capacitor, a significant amount of current is drawn from the battery, causing a significant voltage drop across the internal resistance of the battery. At a certain point in operation, the internal resistance of the defibrillator battery becomes too high and the battery is unable to provide the peak current at the voltage level that the charging circuitry demands. The battery voltage collapses and drops below a power-on-reset threshold within the defibrillator causing the defibrillator to shut down, even though the battery may not be fully depleted of its energy. In other words, the battery voltage drops too low and the defibrillator, believing that the battery is fully depleted of energy, turns itself off. While the defibrillator may be turned back on, the defibrillator may be unable to deliver defibrillation therapy until a new battery is installed.

To prevent premature shutdown of a defibrillator before the battery is fully depleted, a solution has been to reduce the amount of peak current that the defibrillator charging circuitry draws from the battery when the battery terminal voltage has decreased beyond a predetermined level. At a reduced current, the battery voltage is maintained at an acceptable level and the battery is able to continue charging the defibrillator capacitor, albeit at a lower charge rate. Prior techniques for controlling the amount of current drawn from a battery include a microprocessor connected to the battery via an analog-to-digital (A/D) converter to monitor the battery voltage. When the microprocessor determines that the battery voltage has dropped below a specified threshold, the microprocessor commands the capacitor charging circuitry to draw current from the battery at a lower level. A problem inherent with this approach is that the microprocessor may be unable to react quickly enough to a significant drop in battery voltage and the defibrillator may shut down before the charging circuitry can be commanded to draw current at a lower rate.

Given the problems associated with prior art charge rate control, there is a need for capacitor charging circuitry that can quickly respond to decreasing battery voltage in a dynamic manner.

SUMMARY OF THE INVENTION

The present invention provides control circuitry and methods for dynamic control of the rate at which current is drawn from a battery in order to maintain battery voltage at an appropriate level. The control circuitry and methods are particularly suited for charging a defibrillator having high-voltage energy storage capacitors and a charging circuit for controlling capacitor charging. In one aspect, the charging circuit adjusts the amount of current drawn from the battery in response to a voltage measure of the current flowing through a primary winding of a step-up transformer. The invention includes an arrangement of active circuit components that compare the voltage on the battery with a reference voltage and produce a comparison output that is coupled to the charging circuit to adjust the rate at which the energy storage capacitors are charged. In an actual embodiment of the invention, the comparison output is combined with a voltage measure of the current flowing through the step-up transformer primary winding to produce an apparent current signal that is supplied to the charging circuit. The charging circuit adjusts the amount of current drawn from the battery in response to the apparent current signal. In particular, when the battery voltage drops below the reference voltage, the control circuitry of the invention produces a comparison output that, when added to the voltage measure of current flow, produces an apparent current signal that is greater than the actual level of current flowing through the primary winding. The charging circuit reacts by reducing the amount of current drawn from the battery which, in effect, slows the rate of charge of the energy storage capacitors. Because active components are used in the control circuitry of the invention, the control circuitry is able to respond without delay to variations in the battery's terminal voltage.

By dynamically causing an adjustment to the peak current drawn from the battery in response to the battery terminal voltage, the apparent capacity of the battery (i.e., the period of time from which the battery is fully charged to a time when the defibrillator shuts down in response to insufficient battery voltage) is extended.

A further embodiment of the invention includes a microprocessor having an output into the control circuitry. The microprocessor output is added to the reference voltage, thereby adjusting the comparison output described above and the degree to which the charging circuit adjusts the amount of current drawn from the battery during capacitor charging. Accordingly, the microprocessor is provided with a degree of control over the charge rate control function of the control circuitry.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawing, wherein:

The FIGURE is a schematic block diagram of a capacitor charging circuit according to the present invention.

DETAILED DESCRIPTION OF THE PREFERRED EMBODIMENT

The FIGURE illustrates a capacitor charging circuit 100 constructed in accordance with the present invention. The capacitor charging circuit 100 charges a capacitor 116 with electrical energy received from a battery 102. A negative terminal of the battery 102 is connected to circuit ground 104, while a positive terminal of the battery 102 is connected to one end of a primary winding 106 of a step-up transformer 107. The other end of the primary winding 106 is connected to a switch 108. When the switch 108 is closed, current drawn from the battery 102 flows through the primary winding 106 and through a current-sense transformer 110 that is connected in series between the switch 108 and circuit ground 104. When the switch 108 is opened, current flow through primary winding 106 and current-sense transformer 110 is interrupted.

The operation of the switch 108 is controlled by a charge controller 122 via a signal applied to a line 124. When the charge controller 122 directs the switch 108 to close, current flows through the primary winding 106, thereby storing energy in the primary winding. When charge controller 122 directs the switch 108 to open, the current flowing through the primary winding 106 is interrupted, causing a transient fly-back current to be induced on a secondary winding 112 of the step-up transformer 107. The transient current in the secondary winding 112 is rectified by a diode 114 and applied to the terminals of a high-voltage (energy storage capacitor 116. By cyclically opening and closing the switch 108, currents induced in the secondary winding 112 charge the high-voltage energy storage capacitor 116.

A form of pulse width modulation may be used to govern the cycle in which the switch 108 is opened and closed. Depending on design considerations, "pure" pulse width modulation technology or pulse frequency modulation are suitable for use. In an actual embodiment of the invention, a hybrid of pure pulse width modulation and pulse frequency modulation is used.

To monitor the charge on the capacitor 116, the charge controller 122 receives a signal over a line 121 from voltage-reducing circuitry 123 that is connected to the capacitor 116. Voltage-reducing circuitry 123 supplies a reduced voltage signal over line 121 in ratio to the voltage charge on capacitor 116, thus enabling the charge controller 122 to determine the degree to which capacitor 116 is charged. Alternatively, the feedback from voltage-reducing circuitry 123 may be directed to a microprocessor 154 after undergoing appropriate analog-to-digital signal conversion. The microprocessor 154 can issue commands to the charge controller 122 via line 156 to control the operation of the charge controller. Defibrillation therapy control circuitry (not shown) connected to the capacitor 116 selectively discharges the capacitor 116 over a pair of lines 118 and 120 and delivers defibrillation therapy to a patient.

Those skilled in the art will appreciate that the switch 108 described above may be implemented using a number of types of solid state devices. Due to the large amount of electrical current that may flow through the switch 108, it is preferred that a transistor be configured to operate as the switch 108. In that case, a "closed" switch refers to a state wherein the transistor allows current to flow through it while an "open" switch refers to a state in which the transistor does not permit current to flow. In many applications, a field effect transistor is suitable for use as the switch 108, wherein the drain and source terminals of the transistor are connected between the primary winding 106 and the current-sense transformer 110, respectively, while the gate terminal is connected to line 124. Depending on the signal applied to the line 124, the switch 108 may permit or interrupt the flow of current through the primary winding 106. The charge controller 122 controls the amount of current flowing through the primary winding 106, and thus controls the rate at which the capacitor 116 is charged, by controlling the cycles in which the switch 108 opens and closes.

In one aspect, the charge controller 122 adjusts the amount of current drawn from the battery 102 in response to a voltage measure of the current flowing through the primary winding 106. In the illustrated embodiment, a voltage measure of the level of current actually flowing through the primary winding 106 is provided on a line 130 by a current-sense transformer 110 in combination with a current-sense resistor 117. According to the invention, an apparent current signal is produced on a line 126 by combining the voltage measure of actual current on line 130 with a voltage produced by control circuitry 134 on a line 132. In particular, the charge controller 122 receives a voltage signal via line 126 that is a combination of signals present on lines 130 and 132 as combined by summing circuitry 128. The charge controller 122 uses the voltage signal received over line 126 to determine the cycles of operation of the switch 108.

The voltage present on line 130 is a voltage measure of the current flow through the primary winding 106 and the switch 108. As noted above, the embodiment illustrated in The FIGURE uses a current-sense transformer 110 having a primary winding 111 connected in series between the switch 108 and circuit ground 104. During a capacitor charging operation, energy stored by current flowing through primary winding 111 is used to induce a current in a secondary winding 113. The current in secondary winding 113 is rectified by a diode 115 and flows through current-sense resistor 117 to circuit ground 104. The voltage drop across the current-sense resistor 117 is present on line 130. The voltage on line 130 varies with the amount of current flowing through current-sense resistor 117 which, in turn, varies with the current flow in the primary winding 111. Because the primary winding 111 is connected in series with the switch 108 and the primary winding 106, the voltage present on line 130 is ultimately a measure of the current flowing through the primary winding 106.

Although the embodiment described uses a current sensor comprised of current-sense transformer 110 in combination with a current-sense resistor 117, those skilled in the art will appreciate that alternative designs for current sensors exist. For instance, the illustrated current-sense transformer 110 could be eliminated with current-sense resistor 117 being directly connected in series between the switch 108 and circuit ground 104. In that case, the voltage present on line 130 would still be the voltage drop across the current sense resistor 117. As another alternative, a SENSFET transistor could be used to provide a current sensing function. Because an actual embodiment of the invention is used in a defibrillator in which large currents may flow, it is preferred that a current-sense transformer 110, as illustrated, be used because it presents a much lower apparent resistance to a current flowing through switch 108 to circuit ground 104. Accordingly, energy lost due to the voltage drop across the current sensor (in this case, the current-sense transformer) is reduced. A current-sense resistor directly in series between the switch 108 and circuit ground 104 may be suitable for lower current applications.

In instances where the voltage signal present on line 132 is zero, the voltage signal input into the charge controller over line 126 is simply the voltage signal present on line 130. Thus, without any input from line 132, the charge controller 122 receives a voltage signal over line 126 that is a measure of the current flowing through resistor 117 and thus, as described above, the current flowing through the primary winding 106.

As those skilled in the art will appreciate, the charge controller 122 may be designed and implemented with discrete circuit components. However, it may be more advantageous to implement the function of the charge controller 122 with a well known commercially available current mode controller such as the current mode fly-back power supply circuitry manufactured by Motorola and sold under the part identifier MC34129. Many alternative controllers such as Motorola's device sold under the part identifier MC3843 are also available and suitable for use.

The present invention further includes control circuitry 134. The control circuitry provides a comparison function wherein the voltage on the battery 102 is compared with a reference voltage 150. The output of the control circuitry 134 is the voltage present on line 132 that is added to the voltage measure of current flow on line 130 to produce an apparent current signal on line 126.

At the center of the control circuitry 134 is a summing circuit 136. The summing circuit 136 receives a first input signal from a voltage source 150 providing a threshold reference voltage via line 151. A second input signal to the summing circuit 136 is the battery voltage of battery 102 received via line 152 connected to the battery's positive terminal. The third input signal to the summing circuit 136 received via line 144 is an output signal from a microprocessor 154 on line 146 as amplified by amplifier 148.

The first input signal and the third input signal are received at additive terminals of the summing circuit 136 while the second input signal is received at a subtractive terminal of the summing circuit 136. The summing circuit 136 therefore produces a resulting voltage signal on an output line 138 that is the addition of the first input signal and the third input signal minus the second input signal. The resultant signal present on line 138 is amplified by an amplifier 140 and rectified by a diode 142. The output from the diode 142 is the voltage present on line 132.

Those skilled in the art of electronics and circuit design will appreciate that summing circuits for receiving and combining together various signals are well-known in the art and are easily implemented without substantial experimentation. For instance, a suitable summing circuit may include a weighted summer wherein the lines carrying the voltage signals to be added together are connected together at a common node to the inverting input of an operational amplifier. Also connected to this common node is a resistor in a feedback path connected to the output of the operational amplifier. The noninverting input of the operational amplifier is connected to ground. As appreciated by those skilled in the electrical arts, the output of a weighted summer is a combination of the voltage signals present on the various input lines, with each input signal weighted by a ratio of the feedback resistor with the resistance present in the various signal lines. Difference amplifiers are also well known in the art and provide for subtraction of voltage signals. Voltage signals to be subtracted are connected to the noninverting input of the operational amplifier. Whether weighted summers or difference amplifiers are used, they are collectively referred to herein as summing circuits.

In instances where the output from the microprocessor 154 on line 146 is zero, the summing circuit 136 produces an output equal to the difference between the reference voltage provided by voltage source 150 and the voltage of battery 102. Consequently, when the voltage on battery 102 exceeds the reference voltage of voltage source 150, the voltage signal present on line 138 is negative. Even though the voltage on line 138 may be amplified by the amplifier 140, by virtue of the rectifying diode 142, any negative voltage present on line 138 appears as a zero voltage on line 132. Thus, as long as the battery voltage is greater than the reference voltage, the output from summing circuit 128 remains a true measure of the voltage across current-sense resistor 117 and hence the peak current through the primary winding 106.

When the voltage of battery 102 drops below the reference voltage set by voltage source 150, the output voltage from summing circuit 136 on line 138 is positive and is amplified by amplifier 140. The resultant signal flows through the diode 142 to summing circuit 128 via line 132 and is added to the voltage level detected across current-sense resistor 117. The output voltage on line 126 from the summing circuit 128 is consequently greater than the actual voltage across current-sense resistor 117.

In this manner, because of the added voltage from line 132, the charge controller 122 is "deceived" to believe that the voltage across current-sense resistor 117, reflective of the current flowing through the primary winding 106, is greater than it really is. In other words, the charge controller 122 receives an apparent current signal on line 126 that is greater than the actual level of current flowing through the primary winding 106. Consequently, the charge controller 122 modifies the manner in which it operates the switch 108 to reduce the amount of current that is drawn from the battery 102. As the voltage on battery 102 continues to drop further below the reference voltage, the signal on line 132, and thus line 126, increases, thus causing the charge controller 122 to decrease the amount of current being drawn from the battery 102. The amplification provided by amplifier 140 can be designed in conjunction with selecting the reference voltage produced by voltage source 150 to provide a charge rate control function that maximizes the amount of energy drawn from a battery attached to the defibrillator. Furthermore, it is contemplated that multiple stages of control circuitry designed in accordance with the invention may be used to provide a battery-specific, non-linear charge rate control function.

In the embodiment described herein, the amount of current drawn from the battery 102 is decreased in response to decreasing battery voltage. Consequently, the situation is avoided wherein a defibrillator shuts down because current demanded from a partially depleted battery is greater than what the battery can provide at the voltage level required. The process of reducing the current drawn from the battery continues until the internal resistance of the battery rises too high and the battery is considered fully depleted. By using active components (e.g., the amplifier 140, the diode 142, and the components used in summing circuits 128 and 136), the control circuitry of the invention is able to respond to a decrease in battery voltage much faster than conventional digital controllers using a programmed microprocessor.

In alternative embodiments of the invention, rectifying diode 142 may be reversed or eliminated entirely. If the diode 142 is reversed, the control circuit functions in a manner opposite to that described above. In particular, while the voltage on battery 102 exceeds the reference voltage, a negative voltage will be present on line 132 which will reduce the apparent current signal produced by summing circuitry 128, resulting in charge controller 122 increasing the current drawn through primary winding 106. When the voltage on battery 102 drops below the reference voltage, the voltage present on line 132 will be zero due to the rectifying action of the reversed diode 142. A similar result is achieved if a diode is connected from line 132 to circuit ground 104 in a limiter configuration.

If the diode 142 is eliminated entirely, the control circuitry of the invention will cause an apparent current signal on line 126 to be higher or lower than the actual current signal of line 130 depending on whether the battery voltage is greater or less than the reference voltage. Those skilled in the art will further recognize that altering the additive inputs on summing circuitry 136 and 128 to be subtractive inputs, and vice-versa with subtractive inputs being additive inputs, can vary the operation of the invention as desired.

As a further embodiment of the invention, a third input signal on line 144 to the summing circuit 136 allows the microprocessor 154 to have an input into the charge control function of the invention. Depending on the programming of the microprocessor 154, the microprocessor may selectively produce an output signal on line 146. The output signal may undergo pulse width modulation or digital-to-analog conversion (not shown) as desired. The output signal, as amplified by amplifier 148, is added to the resulting signal on line 138 by summing circuit 136. Accordingly, in instances where the voltage on line 138 would otherwise be negative (i.e., when the battery voltage is greater than the reference voltage), if the voltage on line 144 is great enough, the resulting signal on line 138 may be positive, thus producing a voltage signal on line 132 that influences the apparent current signal on line 126, as earlier described. Depending on the amount of amplification designed for amplifier 148, there is a range of battery voltage levels in which, although the battery voltage is greater than the reference voltage, when an output voltage on line 146 is present, a non-zero signal on line 132 is produced and added to the apparent current signal on line 126, thereby causing the charge controller 122 to adjust the amount of current drawn from the battery 102. Allowing the microprocessor 154 to have an input into the charge rate control function is particularly useful in situations where the defibrillator is set to deliver defibrillation therapy at lower energy settings. The microprocessor 154 can prevent significant overcharging of the high-voltage capacitor 116 by reducing the capacitor charge rate and thereby reduce the delays required to bleed down the voltage on the capacitor 116 to the correct defibrillation voltage.

While the preferred embodiment of the invention has been illustrated and described, it will be appreciated that various changes can be made therein without departing from the spirit and scope of the invention. For instance, a charge controller 122 may be configured to integrally include control circuitry 134 so that the charge rate control function is implemented in a single device, rather than the discrete components shown in The FIGURE. It should be understood that the scope of the invention should be determined by the following claims and equivalents thereto.

The embodiments of the invention in which an exclusive property or privilege is claimed are defined as follows:

1. A control circuit for altering a voltage measure of current flow in a circuit line, said voltage measure being used by a current regulating circuit that controls the current flow from a battery through said circuit line in response to said voltage measure, said control circuit comprising:

(a) a first summing circuit having an additive input and a subtractive input, wherein a reference voltage is present at said additive input and the voltage of said battery is present at said subtractive input, said first summing circuit thereby producing a difference voltage of the battery voltage subtracted from the reference voltage;

(b) a diode having an anode terminal and a cathode terminal, wherein said difference voltage is present at the anode terminal of the diode; and (c) a second summing circuit having a first additive input and a second additive input wherein the voltage at the cathode terminal of said diode is present at the first additive input, and said voltage measure of current flow in said circuit line is present at the second additive input, said second summing circuit thereby producing an altered voltage measure that includes said voltage measure of current flow and said voltage present at the cathode terminal of said diode, said altered voltage measure being provided to the current regulating circuit for controlling the current flow from the battery.

2. A control circuit according to claim 1, further including an amplifier connected between said first summing circuit and said diode, said amplifier having an input and an output, wherein said difference voltage produced by said first summing circuit is present at said amplifier input, and said difference voltage present at the anode terminal of said diode is an amplified difference voltage produced at said amplifier output.

3. A control circuit according claim 1, wherein the additive input of said first summing circuit is a first additive input and said first summing circuit further includes a second additive input, wherein said first summing circuit produces a difference voltage of the battery voltage subtracted from the reference voltage added to the voltage present at the second additive input.

4. A control circuit according to claim 3, wherein the voltage present at the second additive input of said first summing circuit is generated by an output of a microprocessor.

5. A control circuit according to claim 4, wherein said voltage generated by an output of a microprocessor is amplified by an amplifier before it is input to the second summing circuit at the second additive input.

6. A capacitor charger comprising:

(a) a battery;

(b) a step-up transformer having a primary winding and a secondary winding, wherein said primary winding is connected to said battery;

(c) a diode connected to said secondary winding;

(d) a capacitor connected to said diode;

(e) a current sensor for sensing current flowing through said primary winding;

(f) a switch connected in series between said primary winding and said current sensor; and (g) control circuitry including:

(i) a charge controller having an input to receive a voltage measure of current flow and an output connected to said switch, wherein said charge controller causes said switch to periodically conduct and interrupt current flow through said primary winding in response to the voltage measure of current flow received at said input;

(ii) a first summing circuit having an additive input and a subtractive input wherein a reference voltage is present at the additive input and the voltage of said battery is present at the subtractive input, said first summing circuit thereby producing a difference voltage equal to the battery voltage subtracted from the reference voltage;

(iii) a diode having an input and an output, wherein said difference voltage is present at the input of said diode; and (iv) a second summing circuit having a first and second additive input, wherein the voltage at the output of said diode is present at the first additive input, and a voltage produced by said current sensor is present at the second additive input, said second summing circuit combining the voltages present at the first and second additive inputs and producing the voltage measure of current flow received at said input of said charge controller.

7. A capacitor charger according to claim 6, further including an amplifier connected between said first summing circuit and said diode, said amplifier having an input and an output, wherein said difference voltage produced by said first summing circuit is present at said amplifier input, and said difference voltage present at the input of said diode is an amplified difference voltage produced at said amplifier output.

8. A capacitor charger according to claim 6, wherein the additive input of said first summing circuit is a first additive input and said first summing circuit further includes a second additive input that receives a voltage output from a microprocessor, wherein said first summing circuit produces a difference voltage equal to the battery voltage subtracted from the reference voltage added to the voltage present at the second additive input.

9. A method of controlling the rate of charge of a capacitor in a capacitor charging circuit, wherein said capacitor charging circuit includes a charge controller for controlling current flow from a battery through a transformer connected to the capacitor, said charge controller controlling current flow in response to an apparent measure of current flow through the transformer, said method comprising:

(a) producing a difference voltage by subtracting the voltage of the battery from a reference voltage;

(b) producing said apparent measure of current flow by adding said difference voltage to a voltage representative of current flow through the transformer; and (c) providing said apparent measure of current flow to said charge controller for controlling current flow through the transformer.

10. A method according to claim 9 wherein said step of producing a difference voltage includes adding a voltage received from an output of a microprocessor to the voltage determined by subtracting the voltage of the battery from a reference voltage.

11. A circuit for controlling a rate at which an energy storage capacitor is charged from a battery, comprising:

(a) a step-up transformer having a primary winding coupled to the battery and a secondary winding coupled to the energy storage capacitor;

(b) a switch that is selectively closed to draw current from the battery through the primary winding of the step-up transformer;

(c) a current sensor that produces a signal indicative of a level of current flowing through the primary winding when the switch is closed;

(d) a charging circuit that monitors a voltage on the energy storage capacitor and selectively opens and closes the switch until a predetermined voltage on the energy storage capacitor is reached; and (e) a comparison circuit that compares a voltage on the battery with a reference voltage, the comparison circuit producing an output that is coupled to the charging circuit to cause the charging circuit to adjust the rate at which the energy storage capacitor is charged.

12. A circuit according to claim 11, wherein the charging circuit controls the rate at which the energy storage capacitor is charged based in part on the level of current flowing through the primary winding of the step-up transformer, the circuit further comprising a summing circuit that produces an apparent current signal that includes the output of the comparison circuit, the apparent current signal being supplied to the charging circuit such that when the voltage on the battery is below the reference voltage, the apparent current signal is greater than an actual level of current flowing through the primary winding, the charging circuit reacting to the apparent current signal to slow the rate of charge of the energy storage capacitor.

\* \* \* \* \*